(12) United States Patent  (10) Patent No.: US 8,447,028 B2
Zhu et al.  (45) Date of Patent: May 21, 2013

(54) SYSTEMS AND METHODS FOR SELF-LEARNING AND BUILDING WEB CONTENTS VIA A RICH CALL CENTER SERVICE

(75) Inventors: Zhongwen Zhu, Saint-Laurent (CA); Qi Nan Qi, Saint-Laurent (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 177 days.

(21) Appl. No.: 12/976,498

(22) Filed: Dec. 22, 2010

(65) Prior Publication Data

US 2012/0164991 A1  Jun. 28, 2012

(51) Int. Cl.
*H04M 3/00* (2006.01)
(52) U.S. Cl.
USPC .................................. 379/265.09; 379/265.02
(58) Field of Classification Search
USPC .............. 379/265.01, 265.02, 265.09, 266.01
See application file for complete search history.

(56) References Cited

U.S. PATENT DOCUMENTS

| 6,438,599 | B1 * | 8/2002 | Chack ........................... 709/229 |
| 7,315,616 | B2 | 1/2008 | Annadata et al. |
| 7,555,115 | B2 * | 6/2009 | Button ..................... 379/265.09 |
| 2004/0203679 | A1 | 10/2004 | McCormack et al. |
| 2007/0160187 | A1 | 7/2007 | Kneipp et al. |
| 2007/0173237 | A1 * | 7/2007 | Roundtree ................ 455/414.1 |
| 2010/0296642 | A1 * | 11/2010 | Hidajat .................... 379/142.06 |
| 2011/0293083 | A1 * | 12/2011 | Larson .................... 379/142.04 |

FOREIGN PATENT DOCUMENTS

WO  2008/070605 A1  6/2008

OTHER PUBLICATIONS

International Search Report for PCT/IB2011/055831, mailing date of May 3, 2012; (5 pages).

* cited by examiner

*Primary Examiner* — Olisa Anwah
(74) *Attorney, Agent, or Firm* — Murphy, Bilak & Homiler, PLLC

(57) ABSTRACT

Systems and methods provide for providing a plurality of information to a caller associated with a call to a service provider. The method includes: receiving, from the caller, the voice call to the service provider; determining that the voice call cannot be answered; responsive to the determination that the voice call cannot be answered, retrieving a first information from a web service associated with the service provider; and transmitting the first information to the caller.

29 Claims, 8 Drawing Sheets

78

| Name: | | 80 |

Emergency: 84 ☐ Yes  84 ☐ No  — 82

Appointment Desired  84 ☐ Yes  84 ☐ No  — 86

Comments: — 88

User A: My toe is swollen.
RQF   : What is wrong with
         your foot?

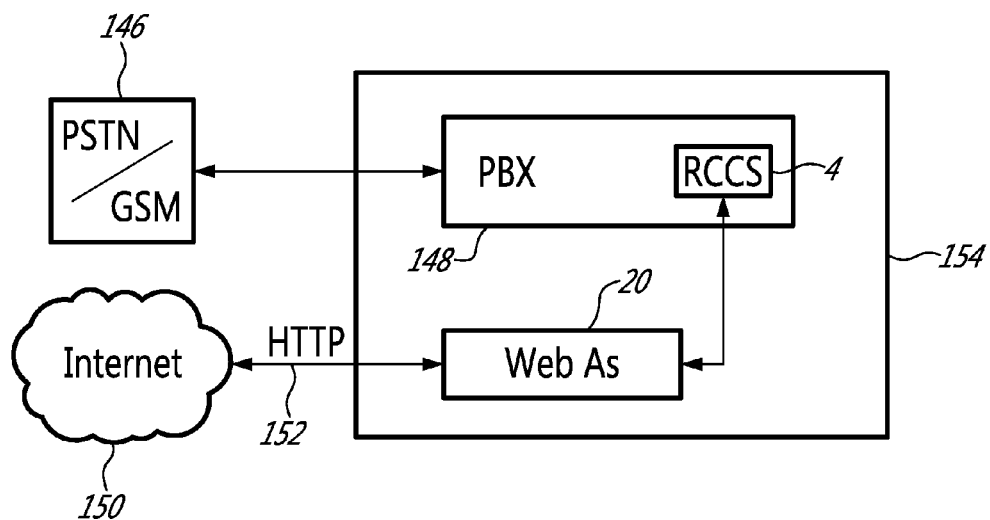
_FIG. 7_
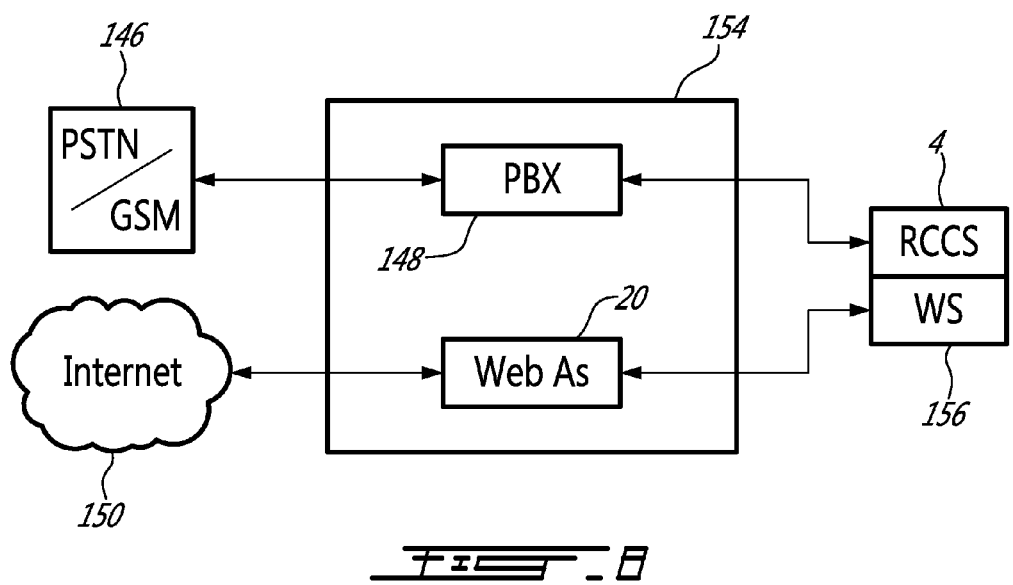
_FIG. 8_

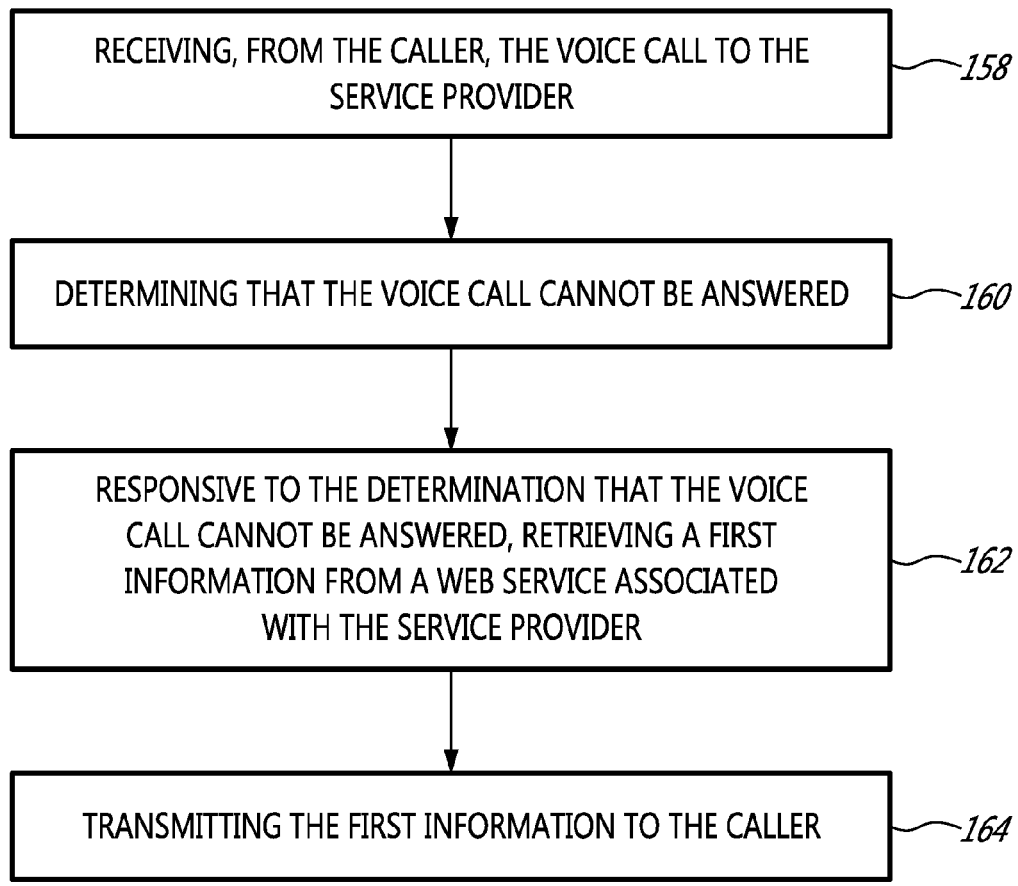

SYSTEMS AND METHODS FOR SELF-LEARNING AND BUILDING WEB CONTENTS VIA A RICH CALL CENTER SERVICE

TECHNICAL FIELD

The embodiments of the subject matter disclosed herein generally relate to communication services and more particularly to call centers and associated methods.

BACKGROUND

During the past years, the interest in using mobile and landline/wireline computing devices in day-to-day communications has increased. Desktop computers, workstations, and other wireline computers currently allow users to communicate, for example, via e-mail, video conferencing, and instant messaging (IM). Mobile devices, for example, mobile telephones, handheld computers, personal digital assistants (PDAs), etc., also allow users to communicate via e-mail, video conferencing, IM, and the like. Mobile telephones have conventionally served as voice communication devices, but through technological advancements they have recently proved to be effective devices for communicating data, graphics, etc. Wireless and wireline technologies continue to merge into a more unified communication system, as user demand for seamless communications across different platforms increases, which in turn creates more usage, and leads to more services and system improvements.

For example, with the advancement of Internet technologies and mobile telephony, users want to enjoy new communication services, which can be accessed anytime, anywhere, on any device, independent of the access network. Users expect services that support their mobility at home, on travel, and on business, and want to be able to use different end user devices. They expect service profiles tailored to the end user devices' capabilities, which enable them to switch easily between their private and business roles, i.e., from one device used at home to another device used at a business location. Moreover, users desire devices which enable easy and comfortable subscriber self-administration.

By way of contrast, many services which have been implemented in the past have not kept up with available technologies. For example, consider a conventional call center. A conventional call center typically receives phone calls in support of a service. Call centers have been used to support trouble shooting, billing issues and general service questions for many industries and service such as computer hardware manufacturers, phone companies and company benefits. These call centers generally only support the use of calls received from both wireline and wireless phones and frequently rely upon human operators to provide at least some interactions with the callers, but do not take advantage of other technologies that exist or could be modified to be used in a call center.

Accordingly, systems and methods for integrating available technologies to improve call center capabilities are desirable.

SUMMARY

Exemplary embodiments describe using a Rich Call Center Server (RCCS) to improve an experience for a user seeking to contact a service provider. By using the functions associated with the RCCS as described in the exemplary embodiments below, more information can be provided to the user than is currently provided by a conventional call center. Moreover, by using other available technologies, delays and frustrations associated with traditional call centers can be reduced to provide a better customer experience.

According to an exemplary embodiment there is a method for providing information to a caller associated with a voice call to a service provider. The method includes: receiving, from the caller, the voice call to the service provider; determining that the voice call cannot be answered; responsive to the determination that the voice call cannot be answered, retrieving a first information from a web service associated with the service provider; and transmitting the first information to the caller.

According to another exemplary embodiment there is a communications node for providing information to a caller associated with a voice call to a service provider. The communications node includes: a communications interface configured to receive a the voice call to the service provider from the caller; a processor configured to determine that the voice call cannot be answered and in response to the determination that the voice call cannot be answered the processor is also configured to retrieve a first information from a web service associated with the service provider; and the communications interface configured to transmit the first information to the caller.

BRIEF DESCRIPTION OF THE DRAWINGS

The accompanying drawings illustrate exemplary embodiments, wherein:

FIG. 4 shows a template according to exemplary embodiments;

FIG. 5 shows a chat window according to exemplary embodiments;

FIG. 7 shows an RCCS used inside of a private branch exchange (PBX) according to exemplary embodiments;

FIG. 8 illustrates an RCCS used in conjunction with a PBX according to exemplary embodiments; and FIG. 9 is a flowchart illustrating a method for providing information to a caller associated with a voice call to a service provider to a caller according to exemplary embodiments.

DETAILED DESCRIPTION

Figure 1:
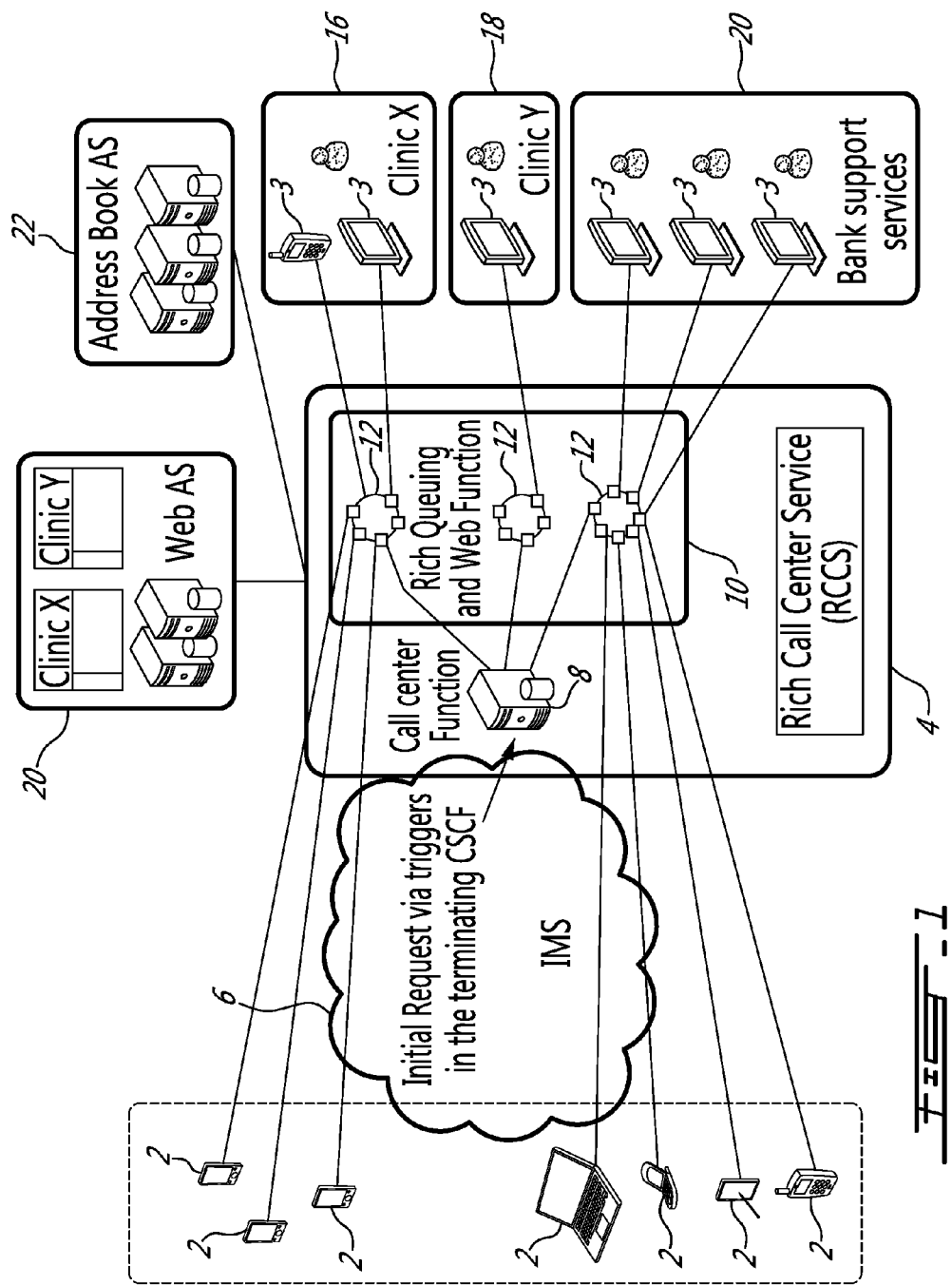
FIG. 1 depicts a Rich Call Center Service (RCCS) and interacting devices according to exemplary embodiments.

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Exemplary methods and systems described herein can, for example, integrate newer technologies into current voice-based call centers to both provide new call center services and to enhance a user's experience with the call center. Prior to describing the various exemplary embodiments in detail, appropriate contextual material will now be described.

Traditional voice based call centers can use various technologies for both handling the receipt of information, e.g., a customer phone call, and for disseminating information to one or more recipients. For example, automatic call distributors and/or dialers can be used to route calls to different agents. Interactive voice response systems and speech recognition systems can be used to provide a response to a caller for various service requests, e.g., a query for an address, open hours of a clinic, account statement for the caller and the like. For transmitting information to recipients, voice broadcasting can send phone messages by computer to hundreds of thousands of call recipients at once, which can be used in both commercial and community applications such as, for example, notification and call reminders. Additionally, a rule-based engine can be used by the call center which allows the call center to configure their system to implement their business rules into the communication system, e.g., a sales call can have a higher priority for delivery than other types of calls.

In some environments, chat and voice interactions can occur as part of the call center service. For example, using SKYPE or GOOGLE talk, agents can handle live calls and live chat, live calls alone or multiple, simultaneous live business chat sessions. In some cases, agents at the call center can convert chat to a live call or the live call to chat. Web based chatting is also used in some cases to provide customer service through a web site.

In another current use case, people have gotten used to utilizing a phone number associated with a service or company which can be identified by a telephone number, to make an appointment with a clinic. When the call is placed on hold due to, for example, high traffic volume, the caller may be provided with an alternative communication tool, corresponding information about company business, or related information that might be interesting to the caller(s). Traditionally, this information, when the call is on hold, is provided to the caller using a simple audio, voice or text message via chat, if the calling device can support those options.

According to exemplary embodiments, by using recent advances in the available technology, both in the calling devices, e.g., smart phones, and in the calling environment, e.g., the advent of Internet Protocol Multimedia Subsystem (IMS) and supporting systems and methods, improvements and additions to services provided by call centers can be delivered. Additionally, according to exemplary embodiments, a company's existing commercial web site can be automatically accessed by a call center to provide more information in a smoother fashion to a caller. According to exemplary embodiments, a Rich Call Center Service (RCCS) and devices which can interact with the RCCS to support exemplary service support systems and methods, are now described with respect to FIG. 1. Note that in this context an RCCS, or more generally a call center, can be implemented as an application server, or any other node which is capable of performing some or all of the functions described herein.

According to exemplary embodiments, a plurality of user equipments (UEs) 2 and 3 are shown in communication with the RCCS 4 via an IMS network 6 with the RCCS 4 being deployed in the IMS network 6. The UEs 2 and 3 can include, but are not limited to, cell phones, laptops and personal digital assistants (PDAs). The RCCS 4 can include a Call Center Function (CCF) 8 which performs the initial interaction with a caller using the UE 2 and a Rich Queuing and Web Function 10 which can include one or more nodes/servers 12 for facilitating the flow of information between callers and business services (as will be described in more detail below). The RCCS 4 can be in communication with a plurality of service providers, shown here in this purely illustrative embodiment as Clinic X 14, Clinic Y 16 and Bank Support Services 20. The RCCS 4 can also be in communication with an Address Book Application Server (AS) 22 (also known as a Network Address Book (NAB) AS) for providing information based on the telephone number of the callee and a Web AS 24 associated with one or more of the service providers.

While an IMS network 6 is shown in FIG. 1, it is to be understood by one skilled in the art that other communications networks are in use and can be used instead of, or in conjunction with, the IMS network 6 for the delivery of the call to the RCCS 4 and follow on interactions. For example, according to some exemplary embodiments which will be described in more detail below, a Global System for Mobile Communications (GSM) network (or other 3G network) could be used for delivering the call to the RCCS 4 instead of IMS network 6. According to another alternative exemplary embodiment, other IP networks can be used as well.

Figure 2:
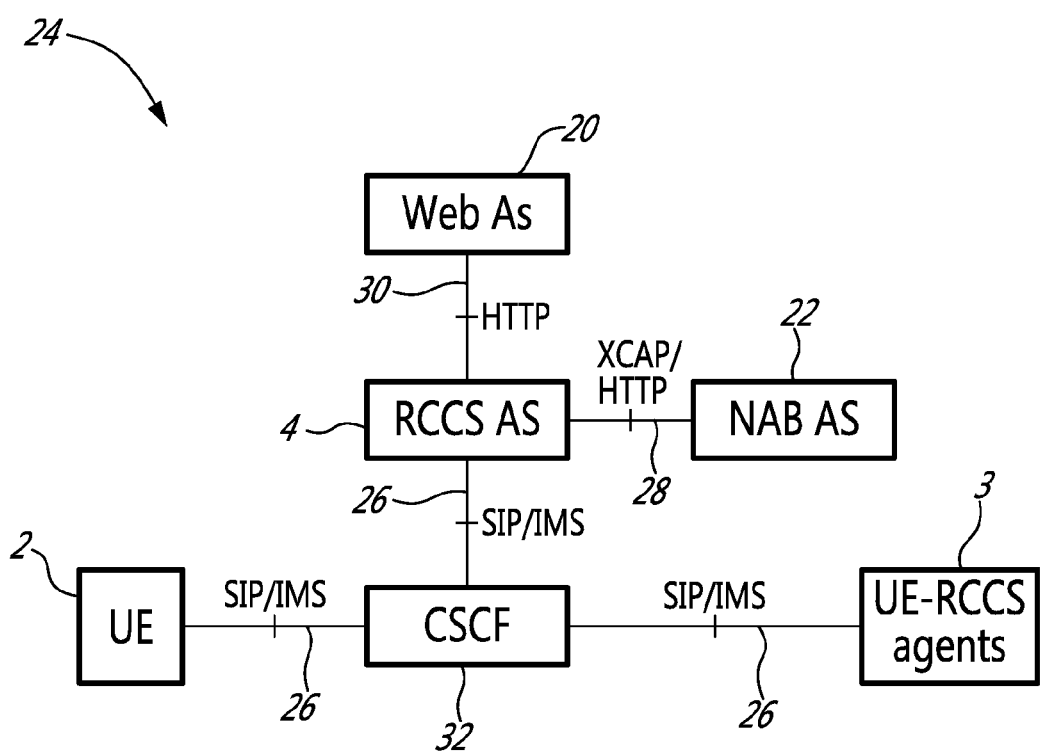
FIG. 2 shows an architecture for supporting interaction with the RCCS according to exemplary embodiments.

According to exemplary embodiments, an architecture for implementing communications between the various nodes which can be in communication with the RCCS 4 is shown in FIG. 2. The architecture 24 includes the UE 2 of the caller as well as the UE 3 of an agent at one of the service providers, i.e., the callee. The UEs 2 and 3 can communicate using Session Initiation Protocol (SIP) over an IMS network 6 to communicate with a Call Session Control Function (CSCF) 32, which in turn communicates using SIP over the IMS network 6 to communicate with the RCCS AS 4. The CSCF 32 can process SIP data packets received from the UE 2, e.g., to terminate and redirect a call from a caller to a service provider to the RCCS 4. Additionally more than one CSCF 35 can exist in the communications architecture 24. The interfaces 26 show where SIP over the IMS network 6 is generally used. The RCCS AS 4 can communicate over interface 28 using eXtensible Markup Language (XML) Configuration Access Protocol (XCAP) and/or Hypertext Transport Protocol (HTTP) with the NAB AS 22 to, for example, retrieve information associated with a received MSISDN as described below. Additionally, the RCCS AS 4 can communicate over interface 30 using HTTP for communicating with the Web AS 20 to interface, as desired, with a service provider's website.

According to an exemplary embodiment, the RCCS 4 can be implemented as a new node which is deployed in an IMS network 6. In such an exemplary embodiment, a service associated with a business (or other entity, e.g., an emergency service) can be accessed by the UE 2 using SIP, e.g., creating a SIP session, in the IMS network 6, with a trigger defined in a terminating serving (S)-CSCF to redirect a service call toward a service provider to the RCCS 4. More specifically, various triggers can be used and defined in the terminating S-CSCF to implement this functionality, e.g., specific callee telephone numbers associated with service providers can be redirected to the RCCS 4. The RCCS 4 can then retrieve an address of a web site for the specific business (or other entity) associated with the telephone number. Using the retrieved website address, the RCCS 4 can access the web site of the business to retrieve information associated with the requested service and to pass on a portion or all of the retrieved information to the UE 2 as desired. For example, the RCCS 4 can use the information retrieved from the service provider's web site to formulate one or more questions that can be sent back to the caller to obtain more information about the specific type of service which is being requested from the service provider. The retrieved information, or some portion thereof, can be stored locally as desired, either for a short term or on a more permanent basis.

According to exemplary embodiments, using the architecture and system shown in FIGS. 1 and 2, the RCCS 4 can provide a plurality of improved and/or new functions to a caller when the caller is calling into a specific business or service which is supported by the RCCS 4. For example, the RCCS 4 can support so-called "service merging", which involves combining the web content, voice and messaging services into a single service towards the end user for the specific business called. The service can be accessed via a traditional dial-up using the telephone number of the business. Alternatively, the service can be accessed via the Internet. A relationship between the company's phone number and web site is realized and stored in a company's address book on, for example, a personal contact card (PCC).

According to exemplary embodiments, the RCCS 4 can also provide a "live support" image to the end users by offering chat and voice call services as well as contents from the company's commercial site. A question and answer sequence can be exchanged between the RCCS 4 and the UE 2. The exchanged information from the live chat(s) can be used to automatically update the company's web site as desired, e.g., updating a question and answer (Q&A) section. Intelligent queuing can also be used to put all, or some subset of, the received requests in a queue for servicing by the service provider based on feedback from the service requests in a flexible fashion or some other predetermined manner. For example, there can be two queues in the case of the service provider being a clinic. In this case the first queue can be for "new" patients and a second queue can be for "old" patients. Differentiation between new and old patients can be made, for example, based upon either the phone number (checked from the clinic database) or from feedback from the caller. Additionally, the queues can be given different priorities, e.g., patients in the new patient queue can have a higher priority. This can be implemented by, for example, exchanging a template posted on the company's web site with the UE 2.

According to another exemplary embodiment, the RCCS 4 can also provide support for multiple sessions by providing the ability for a single recipient in the individual enterprise/business to handle multiple incoming service requests at a same time. However, the number of sessions to be supported can depend upon an agreement between the individual enterprise/business and the service provider/operator.

Thus, as described generally above, according to exemplary embodiments a user can make a service request call to a business, e.g., a clinic, and experience an improved call center experience by having more information available to the user with the information being delivered in a usable fashion. An exemplary call flow to implement such embodiments is now described with respect to the call flow diagram shown in FIG. 3. Therein, a user decides to call, e.g., a voice call, a clinic to setup an appointment and dials the clinic's phone number with UE 2 as shown by Request message 36. The Request message 36 is received by an originating S-CSCF 34, which can be located in the user's home network, which then forwards the call as Request message 38 to the terminating S-CSCF 35 based upon the telephone number of the clinic (while only two S-CSCFs are shown here, those skilled in the art will appreciated that other nodes can exist between the originating S-CSCF 34 and the terminating S-CSCF 35). The terminating S-CSCF 35 reads the telephone number of the call and, based on its triggering instructions, the terminating S-CSCF 35 redirects the call as Request message 40 to the CCF 8 in the RCCS 4. Various triggering functions can be used. For example, the trigger could be, for a specific telephone number, to automatically redirect any call to the RCCS 4 or, alternatively, if the terminating S-CSCF 35 realizes that the clinic associated with the telephone number has no more capacity to receive a call then the call can be redirected to the RCCS 4. Yet another alternative is to redirect calls associated with particular callee telephone numbers when the call is placed on hold or when a busy signal is returned. However, other triggers can also be used as desired.

According to exemplary embodiments, when the Request message 40 is received by the CCF 8 within the RCCS 4, the CCF 8 determines (shown as step 42) if the queuing web object for the clinic exists based upon the callee's telephone number. If there is no queuing web object for the callee's telephone number associated with the redirected call then a new queuing object can be created. If the CCF 8 verifies that the queuing web object for the callee's telephone number exists, e.g., by finding the queuing web object for the clinic in memory, the CCF 8 sends the request to the Rich Queuing and Web Function (RQF) 10 to join an existing queuing object in message 44.

The RQF 10 then sends a Request message 46 to the NAB AS 22 requesting an address of the clinic's web site based upon the callee's telephone number. Additionally, the RQF 10 can transmit a success response message back to the UE 2 while establishing a session between the UE 2 and the RQF 10. These steps are shown by messages 48, 50, 52 and 54 (180 ringing messages), 56, 58, 60 and 62 (200 OK messages), and 64, 66, 68 and 70 (acknowledgment (ACK) messages). After receiving the Request message 46, the NAB AS 22 sends the response which includes the address of the clinic's web site as Response message 72 back to the RQF 10. The RQF 10 can then send a request message 74 to the Web AS 20, based upon the received web address in the Response message 72, which hosts the clinic's web site. Request message 74 can, for example, include a request for a template for obtaining relevant information from the caller. This template can be a generic template or in some cases modified by any information previously received by the RCCS 4 associated with the UE 2's caller. Additionally, other information can be requested by the Request message 74 or automatically given by the Web AS 20 as desired for future use by the RQF 10.

According to exemplary embodiments, the template can include various fields and information requests which may be tailored depending upon the service provider, e.g., the template used by a clinic may be different from a template used by a banking service. FIG. 4 shows a purely illustrative template 78 which may be used by a clinic. Template 78 can include a Name field 80, an Emergency field 82 which can include check boxes 84 for either "Yes" or "No", an Appointment Desired field 86 which can also include check boxes 84 for either "Yes" or "No" and a Comments field 88. Information from Emergency field 82 and/or the Comments field 88 could be used for prioritizing the response by, for example, using a key word search, to the template 78, however other methods of prioritization could also be used. While template 78 is shown here as an example of information which can be exchanged between the RCCS 4 and the UE 2, it will be appreciated that other forms of information may instead be exchanged and that the word "template" as used herein can also cover other forms of information to include at least one query for the caller.

Figure 3:
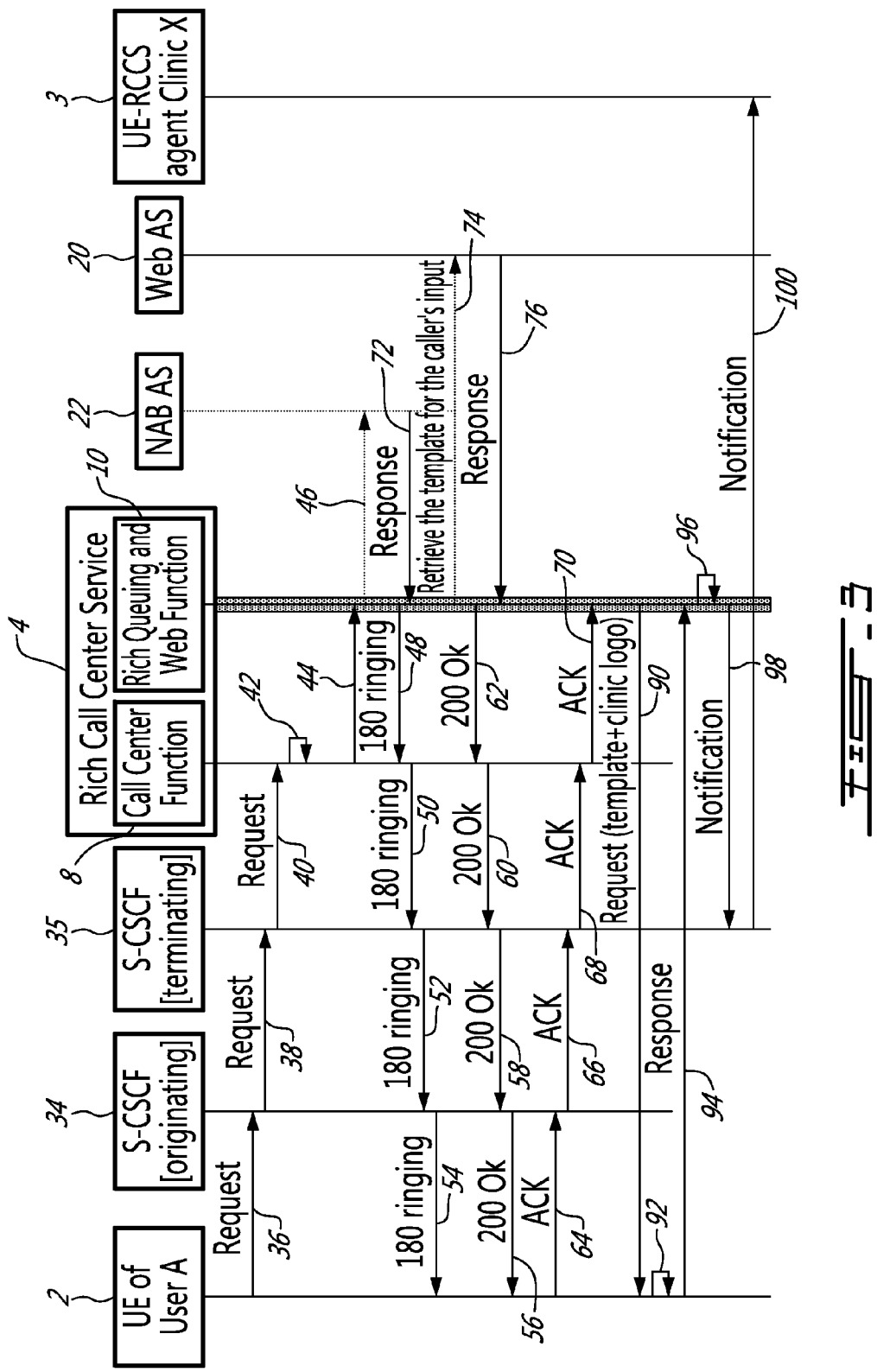
FIG. 3 illustrates an exemplary call flow according to exemplary embodiments.
Figure 3:
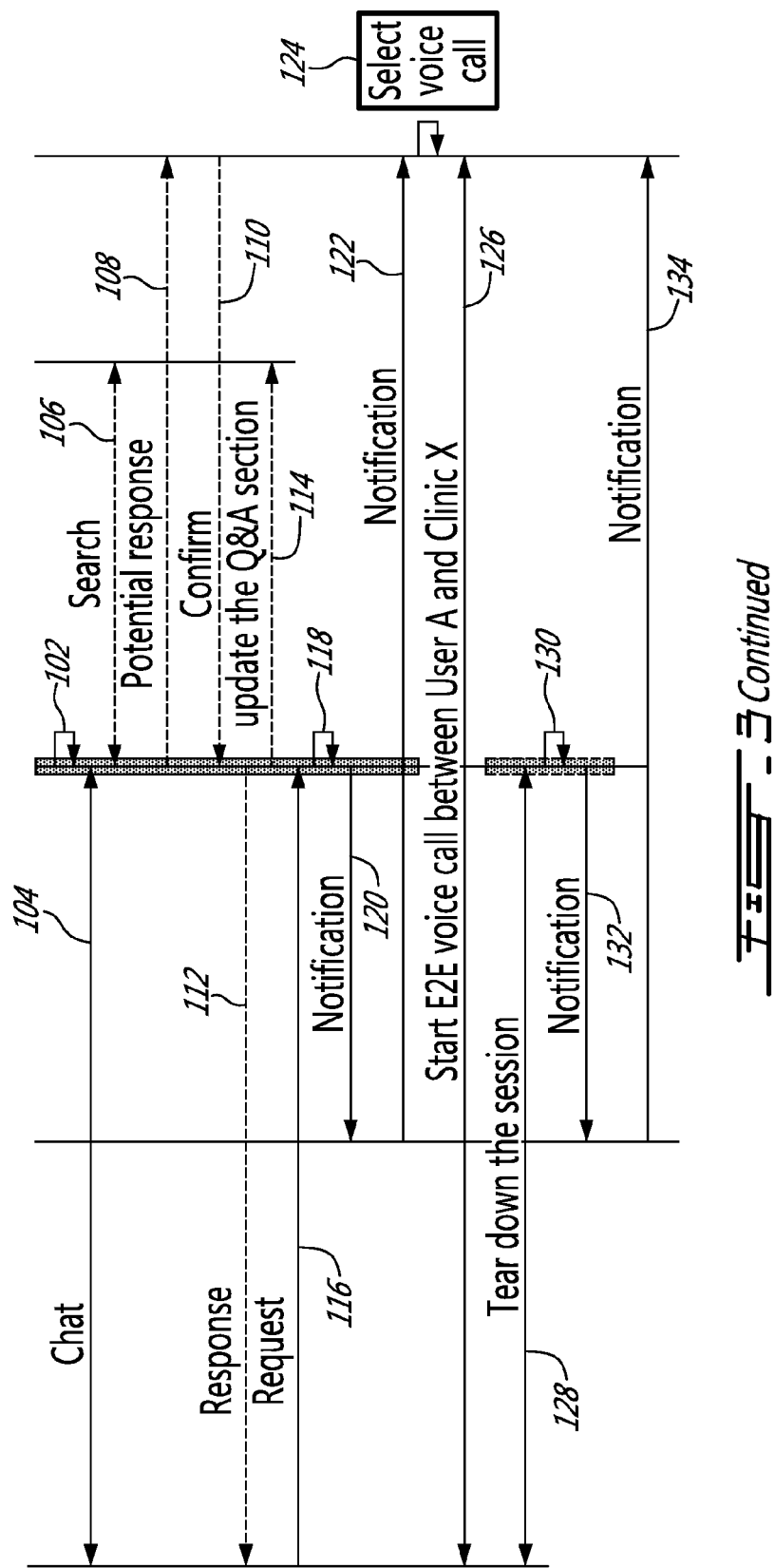

Returning to the exemplary signalling diagram shown in FIG. 3, after the RQF 10 receives the Response message 76, the RQF 10 can transmit a Request message 90 which can include the template 78, a clinic logo and/or other information as desired to the UE 2 using the previously established session. It is to be understood that, for this part of the shown exemplary embodiment, that the UE 2 has a browser that supports interaction with template 78. According to an alternative exemplary embodiment, the RCCS 4 can translate the information (or some portion of the information) received from the Web AS 20 from a visual media into a sound, e.g., voice, media as desired for transmission to the UE 2 instead of transmitting the visual media described above. After receiving the Request message 90, the caller, using UE 2, can input information into the template 78, as shown in step 92, prior to transmitting the filled in template 78 as Response message 94. The RQF 10 receives the Response message 94 from the UE 2 and puts the user into a queue, as shown in step 96, possibly with a priority based upon information within the template 78. The RQF 10 then transmits a Notification message 98 to the terminating S-CSCF 35 informing the terminating S-CSCF 35 of an update of the queue which is then transmitted by the S-CSCF 35 to the UE 3 of an agent at the clinic as Notification message 100.

According to exemplary embodiments, one or more individuals from the clinic can subscribe to notifications of the queue. In the case of the RCCS 4 supporting multiple service providers there can be multiple queues supported with each service provider subscribing to different queues as is desirable. These agents of the service providers can subscribe a specific queue by subscribing to the RQF 10 via the terminating S-CSCF 35.

Returning to the signalling diagram of FIG. 3, according to exemplary embodiments the RQF 10 can create and manage a chat session with the caller via UE 2. For example, the RQF 10 can begin an automatic chat session based upon information retrieved from the Web AS 20 associated with the service provider (as shown by step 102) and, as desired, modified by information received in the template 78 response. The chat session between the caller on the UE 2 and the RQF 10 is shown by Chat message 104. A purely illustrative chat window 115 is shown in FIG. 5. This exemplary chat window 115 includes a text entry box 117 and a chat history box 119. As the chat progresses, the RQF 10 can perform one or more searches 106, if previously received information is not satisfactory, of the Web AS 20 (or other web sites and/or databases based upon owner permissions) for information associated with information received during the chat from the caller possibly as modified by instructions/programming at the RQF 10, e.g., the RQF 10 could have an expert system or key word search as part of its logic. Additionally, or alternatively, the RCCS 4 at any desired point after receiving the initial call from the UE 2 can push rich web content, e.g., multimedia content, messaging service and traditional voice/audio service to the caller based upon, for example, the UE 2's capabilities and/or wait time associated with the clinic agent's availability.

According to exemplary embodiments, the RQF 10 can generate a potential response (or responses) to the caller which are then transmitted from the RQF 10 to the UE 3 of the agent at the clinic, as Potential response message 108. The agent can then review the Potential response message 108 and approve it as is or modify it as desired. This confirmation (or modification) message 110, which is optional but possibly desirable when no direct answer is available from the RQF 10, is transmitted from the UE 3 of the agent at the clinic to the RQF 10. This confirmation (or modification) is then transmitted as Response message 112 from the RQF 10 to the UE 2 for the caller's review. Additionally, around this time, the RQF 10 can use the context of the approved response to update a Question and Answer (Q&A) section of the service provider's web site if desired as shown by the update the Q&A section message 114. This update of the service provider's web site can be automatically generated during the ongoing session or interactively modified by the service provider.

According to exemplary embodiments, the caller, e.g., user A, can decide to have either a voice call or a live chat with the agent at the service provider. Continuing with the exemplary signalling diagram shown in FIG. 3, User A of UE 2 decides to request a either a voice call or a live chat with an agent of the clinic as shown by Request message 116. Once the RQF 10 receives the Request message 116, the RQF can update the priority for User A as desired as shown in step 118. The RQF 10 can then send a notification regarding the update of the queue to the terminating S-CSCF 35 as shown by Notification message 120. The terminating S-CSCF 35 can then forward the update notification to the UE 3 of the agent at the clinic as shown by Notification message 122. Since an option between a voice call and a live chat was given to the agent at the clinic, in this example, the agent at the clinic decides to select a voice call (as shown by step 124) with User A, and UE 3 starts an end to end (E2E) voice call 126 between UE 3 and UE 2. According to an exemplary embodiment, this voice call 126 may be performed outside of the queuing web object. After the voice call, User A hangs up UE 2 which generates a request to tear down the session as shown by a session tear down message 128 which is communicated between the UE 2 and the RQF 10. At step 130, the RQF 10 cleans up the session and updates the notification queue. The RQF 10 can then transmit the notification to the terminating S-CSCF 35 as Notification message 132. The terminating S-CSCF 35 then forwards the notification to the UE 3 of the agent at the clinic to end this exemplary process as Notification message 134.

As described above and shown in FIG. 3, an IMS network can be used for a portion of the transmitted signals. However, according to alternative embodiments, if a GSM network is used by the UE 2 to make the initial voice call to the service provider much, if not all, of the functionality of the RCCS 4 can still be experienced by the caller using UE 2. For example, according to an exemplary embodiment, upon receipt of the call (which enters the IMS network 6 via a break-in node (not shown)) from the GSM network the terminating S-CSCF 35 can query an associated Home Subscriber Server (HSS) to lookup a SIP Uniform Resource Identifier (URI) for the user associated with UE 2. An SIP session over the IMS network 6 can then be setup for the user on UE 2 which allows all of the functionality of the exemplary embodiments described above with respect to FIG. 3 to be performed. According to another exemplary embodiment, in the case where a SIP Uniform Resource Identifier URI cannot be found for the user associated with UE 2, the signalling steps associated with sending web content and the template 78 are not performed. Instead they can be replaced by using by creating a chat session using Short Message Service (SMS) with the UE 2. The chat session can be performed by either or both the RQF 10 and the UE 3 of the agent at the clinic as desired and translated into SMS prior to sending the SMS messages to the UE2 via the GSM network.

According to another exemplary embodiment, transportation equipment, e.g., cars, can be equipped with a dashboard (or other piece of equipment) which can have the capability to handle voice calls as well as rich multimedia display to include, but not be limited by, the ability to play High Definition multimedia, to potentially include the functions of a smartphone and to be able to fully interface with the RCCS 4. In support of this, the client side of the RCCS 4, e.g., a SIP user agent for an IMS device, can be installed or configured in the dashboard such that the user can experience any or all of the functionality described above with respect to FIGS. 3-5.

Exemplary embodiments described herein can allow for an excellent use experience for a caller by allowing the end user to make use of a phone number to a service provider to access the service provider and to receive information from various support services as well as updated web contents. Exemplary embodiments described herein, can also allow service providers to provide additional information in a variety of formats to an end user as well as potentially providing more efficient call center service by, for example, offering more information in an upfront manner which may reduce the load on actual agents working at the service provider or providing useful information to callers during the time when the callers would have traditionally been on hold. Additionally, by implementing an RCCS 4 a service provider may be able to positively differentiate themselves from competing service providers.

Figure 6:
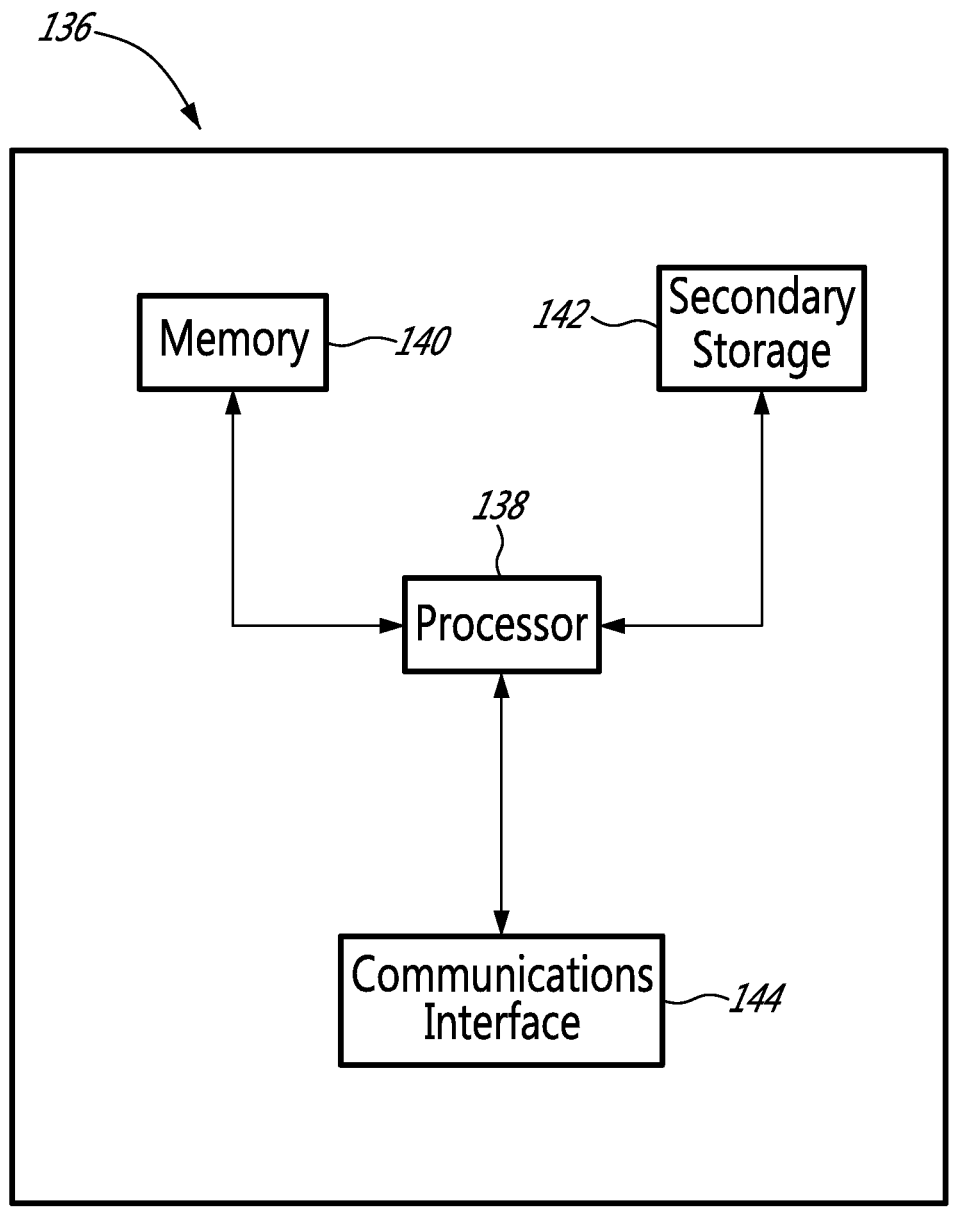
FIG. 6 illustrates a communications node according to exemplary embodiments.

The exemplary embodiments described above can integrate newer technologies into current voice based call centers to both provide new services by a call center and to enhance a user's experience with the call center. An exemplary communications node 136, which can be the RCCS 4, the terminating S-CSCF 35, the UE 2 or 3, or any node with similar functionality, will now be described with respect to FIG. 6. The communications node can contain a processor 138 (or multiple processor cores), memory 140, one or more secondary storage devices 142 and an interface unit 144 to facilitate communications between communications nodes, devices, e.g., UE 2, RCCS 4 and the rest of the network. The processor 112 can execute instructions to facilitate the exemplary embodiments described above with respect to the signalling diagram shown in FIG. 3 as well as for the method described with respect to the flowchart of FIG. 7. Memory 140 can store instructions, applications and the like which may be used by the processor 138 in support of the exemplary embodiments described herein. For example, the instructions stored in memory 140 when executed by the processor 138 can act as an expert system to query the caller as well as search various websites for information of potential use to push to the caller.

According to another exemplary embodiment, the RCCS 4 can be implemented within a company's local area network (LAN) as shown in FIG. 7. Initially, a caller makes a voice call which can be originated from either the existing public switched telephone network (PSTN) or a GSM network (shown jointly as PSTN/GSM box 146) and routed to a private branch exchange (PBX) 148 which is located within the service provider's LAN 154. The PBX 148 can then trigger a connection to the RCCS 4 instead of having the call answered by the recipient user agent of the service provider. The PBX 148 can include the RCCS 4 or the RCCS 4 can be located elsewhere in the service provider's LAN 154. The RCCS 4 can communicate with the Web AS 20 which is also located within the service provider's LAN 154. The Web AS 20 can also communicate with the Internet 150 as desired by, for example, using HTTP communications 152. If the caller and if the functions within service provider's LAN 154 include the necessary functionality SMS or chat session(s) can be performed in a manner similar to those described in the above exemplary embodiments.

According to another exemplary embodiment, the RCCS 4 can be implemented in conjunction with a company's LAN 154 as shown in FIG. 8. Initially, a caller makes a voice call which can be originated from either the existing public switched telephone network (PSTN) or a GSM network (shown jointly as PSTN/GSM box 146) and routed to a private branch exchange (PBX) 148 which is located within the service provider's LAN 154. The PBX 148 can then trigger a connection to the RCCS 4 instead of having the call answered by the recipient user agent of the service provider. The RCCS 4 can be located outside of the company's LAN 154 and the RCCS 4 can include (or be in communication with) a web service (WS) 156. The RCCS 4 can communicate with the Web AS 20, which is located within the service provider's LAN 154, via the WS 156. The Web AS 20 can also communicate with the Internet 150. If the caller and if the functions within service provider's LAN 154 include the necessary functionality SMS or chat session(s) can be performed in a manner similar to those described in the above exemplary embodiments.

An exemplary method for providing information to a caller associated with a voice call to a service provider is illustrated in FIG. 9. Therein, at step 158 receiving, from the caller, the voice call to the service provider; at step 160 determining that the voice call cannot be answered; at step 162 responsive to the determination that the voice call cannot be answered, retrieving a first information from a web service associated with the service provider; and at step 164 transmitting the first information to the caller.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items. Skilled readers will readily acknowledge that these are provided to illustrate the teachings of the invention and should not be construed as the only possible implementations of the present invention.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for providing information to a caller associated with a voice call to a service provider, the method comprising:

receiving, at a call center, the voice call from a device associated with the caller, the voice call including a telephone number associated with the service provider, wherein the voice call has been redirected from said service provider to said call center; and responsive to receiving the voice call as redirected from the servicer provider:

querying, by said call center, a network address book with the telephone number to obtain a second information about the service provider, wherein the second information includes a web address for the service provider;

retrieving, by said call center, a first information associated with the service provider using the web address; and transmitting, by said call center, the first information towards the device.

2. The method of claim 1, wherein receiving the voice call comprises receiving the voice call as redirected to the call center upon the voice call being put on hold at the service provider.

3. The method of claim 1, wherein the call center establishes a session with the device and the method further comprises the call center transmitting at least one query based on the first information towards the device.

4. The method of claim 3, wherein the at least one query is part of a template.

5. The method of claim 4, further comprising:

receiving the template after the caller has entered information into the template resulting in a filled in template;

placing the caller into a queue for handling by the service provider with a priority based upon information in the filled in template; and transmitting a notification message to the service provider.

6. The method of claim 5, further comprising:

updating information associated with the service provider based upon information gathered from at least one of the filled in template or a response to the filled in template.

7. The method of claim 6, further comprising:

preparing a response to the filled in template.

8. The method of claim 7, further comprising providing the response to the filled in template to the service provider, for review and selective modification by the service provider.

9. The method of claim 1, further comprising:

establishing at least one of a voice call and a chat session with the device.

10. The method of claim 1, wherein the voice call is initiated from the device operating in a Global System for Mobile Communications (GSM) network, and wherein the call center communicates with the device via the GSM network.

11. The method of claim 1, wherein the voice call is transmitted over an IMS network, and wherein the call center communicates with the device via the IMS network.

12. The method of claim 10, wherein the first information has been translated from web content to voice, for transmission to the device.

13. The method of claim, 1, wherein receiving the voice call comprises receiving the voice call as redirected to the call center by a private branch exchange.

14. A communications node for providing information to a caller associated with a voice call to a service provider, the communications node comprising:

a communications interface configured to receive the voice call from the caller, the voice call including a telephone number associated with the service provider, wherein the voice call has been redirected from the service provider to the communications node; and a processor associated with the communications interface and configured to respond to receiving the voice call as redirected from the service provider, based on being configured to:

query a network address book with the telephone number to obtain a second information about the service provider, wherein the second information includes a web address for the service provider;

retrieve a first information associated with the service provider using the web address; and transmit the first information towards the device.

15. The communications node of claim 14, wherein the voice call has been redirected when the caller was put on hold at the service provider.

16. The communications node of claim 14, wherein the processor is further configured to establish a session with the device and to send at least one query to the device, wherein the at least one query is based on the first information.

17. The communications node of claim 16, wherein the at least one query is part of a template.

18. The communications node of claim 17, wherein the communications interface is configured to receive the template after the caller has entered information into the template resulting in a filled in template and configured to transmit a notification message to the service provider, and further wherein the processor is configured to place the caller into a queue for handling by the service provider with a priority based upon information in the filled in template.

19. The communications node of claim 18, wherein the communications node is configured to update information associated with the service provider based upon information gathered from at least one of the filled in template or a response to the filled in template.

20. The communications node of claim 19, wherein the processor is configured to prepare a response to the filled in template.

21. The communications node of claim 20, wherein the processor is configured to provide the response to the filled in template to the service provider, for review and selective modification by the service provider.

22. The communications node of claim 14, wherein the processor is configured to establish at least one of a voice call and a chat session to the device.

23. The communications node of claim 14, wherein the voice call is initiated from the device operating in a Global System for Mobile Communications (GSM) network, and wherein the communications node is configured to communicate with the device via the GSM network.

24. The communications node of claim 14, wherein the voice call is transmitted over an IMS network, and wherein the communications node is configured to communicate with the device via the IMS network.

25. The communications node of claim 23, wherein the processor is configured to translate the first information from web content to voice for transmission to the device.

26. The communications node of claim 14, wherein the communications node is a Rich Call Center Server (RCCS).

27. The communications node of claim 14, wherein the voice call is received by a private branch exchange, and wherein the communications node is configured to receive the voice call as redirected from the private branch exchange.

28. The method of claim 3, wherein the session is a Session Initiation Protocol (SIP) session.

29. The communications node of claim 16, wherein the session is a Session Initiation Protocol (SIP) session.

\* \* \* \* \*